United States Patent
Vardhan (10) Patent No.: US 10,769,481 B2
(45) Date of Patent: Sep. 8, 2020

(54) SYSTEM AND METHOD FOR EXTRACTION OF DESIGN ELEMENTS OF FASHION PRODUCTS

(71) Applicant: Myntra Designs Private Limited, Bangalore (IN)

(72) Inventor: Makkapati Vishnu Vardhan, Bangalore (IN)

(73) Assignee: MYNTRA DESIGN PRIVATE LIMITED, Bangalore (IN)

( * ) Notice: Subject to any disclaimer, the term of this patent is extended or adjusted under 35 U.S.C. 154(b) by 197 days.

(21) Appl. No.: 15/979,633

(22) Filed: May 15, 2018

(65) Prior Publication Data

US 2019/0073555 A1 Mar. 7, 2019

(30) Foreign Application Priority Data

Sep. 7, 2017 (IN) .............................. 201741031710

(51) Int. Cl.
| | |
|---|---|
| *G06K 9/00* | (2006.01) |
| *G11B 27/00* | (2006.01) |
| *G06K 9/46* | (2006.01) |
| *G06T 7/62* | (2017.01) |
| *G06T 7/11* | (2017.01) |
| *G06T 7/12* | (2017.01) |
| *G06T 11/00* | (2006.01) |

(52) U.S. Cl.
CPC .............. *G06K 9/4604* (2013.01); *G06T 7/11* (2017.01); *G06T 7/12* (2017.01); *G06T 7/62* (2017.01); *G06T 11/00* (2013.01); *G06T 2210/16* (2013.01)

(58) Field of Classification Search
USPC ................ 382/100, 103, 106, 111, 168, 173, 382/180–181, 190, 199, 203, 209, 214, 382/219, 254, 274, 276, 286, 294, 305, 382/312; 705/26.62; 386/282
See application file for complete search history.

(56) References Cited

U.S. PATENT DOCUMENTS

| | | | | |
|---|---|---|---|---|
| 2014/0363143 | A1* | 12/2014 | Dharssi ............. | G06K 9/00765 386/282 |
| 2016/0180433 | A1* | 6/2016 | Adeyoola ............ | G06T 19/006 705/26.62 |
| 2017/0249692 | A9* | 8/2017 | Lin-Hendel ....... | G06Q 30/0643 |
| 2017/0323374 | A1* | 11/2017 | Park ....................... | G06T 11/60 |
| 2018/0374136 | A1* | 12/2018 | Kanii ................ | G06O 30/0621 |
| 2019/0050427 | A1* | 2/2019 | Wiesel ..................... | G06T 7/11 |

* cited by examiner

*Primary Examiner* — Seyed H Azarian (74) *Attorney, Agent, or Firm* — Harness, Dickey & Pierce, P.L.C.

(57) ABSTRACT

A system and method for extraction of design elements of a fashion product is provided. The system includes a memory having computer-readable instructions stored therein. The system further includes a processor configured to access a catalogue image of a fashion product. In addition, the processor is configured to segment the catalogue image of the fashion product to determine an article of interest of the fashion product. The processor is further configured to generate an outer contour of the article of interest using a contour tracing technique. Moreover, the processor is configured to analyze coordinates of the generated contour based upon convexity defects of the contour to identify one or more design points. Furthermore, the processor is configured to extract one or more design elements of the fashion product using the identified design points.

14 Claims, 5 Drawing Sheets

SYSTEM AND METHOD FOR EXTRACTION OF DESIGN ELEMENTS OF FASHION PRODUCTS

PRIORITY STATEMENT

The present application hereby claims priority under 35 U.S.C. § 119 to Indian patent application number 201741031710 filed 7 Sep. 2017, the entire contents of which are hereby incorporated herein by reference.

FIELD

Embodiments of the invention relate generally to fashion e-commerce and more particularly to a system and method for extraction of the design elements of fashion products marketed on an e-commerce platform.

BACKGROUND

Building relationships with consumers has always been a challenging task for a retailer and vice-versa. With the rapid development of diverse e-business solutions, companies are now looking for new opportunities to get in touch with the consumers. Fashion e-commerce brings a lot of functional and financial benefits and makes it very simple and convenient for the consumers with ease of shopping at home.

Besides consumers, the retailers have benefits to expand their clientele worldwide through e-commerce. This helps to increase their business with relatively less efforts related to advertising, sponsorship etc. as the internet has a wide reach around the world. Advantageously, fashion e-commerce acts a boon for consumers as well as retailers when it comes to shop with choice, ease, convenience and earning profit.

Existing fashion e-commerce websites use a variety of filtering techniques to narrow down or refine the search results of a particular product category listing, for example, by size, colour, price or brand. Multiple filters may be applied to take a broad range of products and refine them into a narrower selection, allowing the consumers to retrieve the most relevant search results based on the criteria they have selected. Fashion e-commerce, especially apparel industry still suffers from poor filtering performance because of insufficient filters at granular level.

Currently, most of the fashion e-commerce websites provide generic attribute search such as brand, price, colour and size. However, it can be useful to have finer filtering options which provide unique filters specific to each product type. Such filters enable users to narrow down a website's selection of thousands of products to only those few items that match their particular needs and interests. Moreover, the finer details of the products such as in apparels, may be helpful in identifying design elements that make up the top selling products. Yet, despite it being a central aspect of the user's e-commerce product browsing, most e-commerce websites offer a lacklustre filtering experience.

Hence, there is a need to effectively extract design elements from fashion products to provide filtering at a granular level to help the consumer achieve maximum product discoverability, and reduce any sort of navigation friction. In addition, identified and extracted design elements of a product through finer filters can be used in design automation for in-house branding. Thus, can facilitate a fully-automated design collection, without any human intervention.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a system and method for extraction of design elements of fashion products.

Briefly, according to an example embodiment, a system for extraction of design elements of a fashion product is provided. The system includes a memory having computer-readable instructions stored therein. The system further includes a processor configured to access a catalogue image of a fashion product. In addition, the processor is configured to segment the catalogue image of the fashion product to determine an article of interest of the fashion product. The processor is further configured to generate an outer contour of the article of interest using a contour tracing technique. Moreover, the processor is configured to analyze coordinates of the generated contour based upon convexity defects of the contour to identify one or more design points. Furthermore, the processor is configured to extract one or more design elements of the fashion product using the identified design points.

According to another example embodiment, a method for extracting design elements of a fashion product is provided. The method comprises accessing a catalogue image of a fashion product and segmenting the catalogue image of the fashion product to determine an article of interest of the fashion product. The method further comprises generating an outer contour of the article of interest using a contour tracing technique. In addition, the method comprises analyzing coordinates of the generated contour based upon convexity defects of the contour to identify one or more points corresponding to the design elements. The method further comprises extracting one or more design elements of the fashion product using the identified design points.

According to yet another example embodiment, a system for extraction of design elements of a fashion product is provided. The system includes a memory having computer-readable instructions stored therein. The system further includes a processor configured to access a catalogue image of a fashion product. The processor is configured to segment the catalogue image of the fashion product to determine an article of interest of the fashion product. In addition, the processor is configured to generate an outer contour of the article of interest using a contour tracing technique. Moreover, the processor is configured to determine a plurality of convex hull points of the generated contour and to determine one or more convexity defect points using the plurality of convex hull points to identify one or more design points. Furthermore, the processor is configured to extract one or more design elements of the fashion product using the identified design points.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 3-A illustrates an example catalogue image of a fashion product accessed using the system 100 of FIG. 1, according to the aspects of the present technique;

FIG. 3-B illustrates an example image of an article of interest of the fashion product of FIG. 3-A, according to the aspects of the present technique;

FIG. 4-A illustrates identification of design points of the article of interest, according to the aspects of the present technique;

FIG. 4-B illustrates the extracted design elements of the fashion product, according to the aspects of the present technique;

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between odules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like manner (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a system for extraction of the design elements of fashion products such as marketed on an e-commerce platform.

Figure 1:
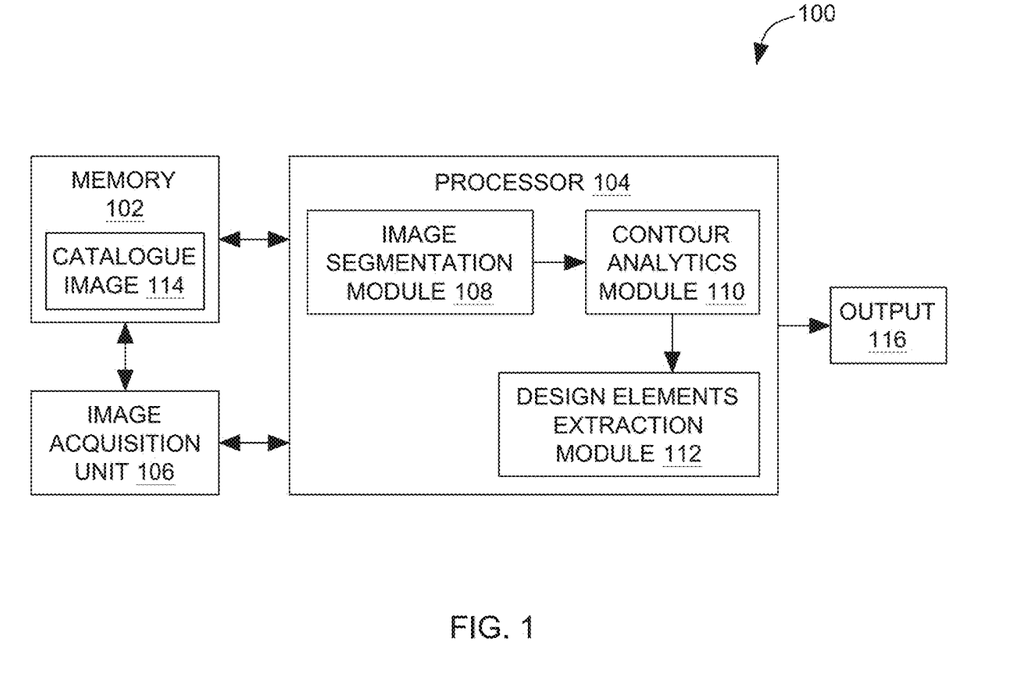
FIG. 1 is a block diagram illustrating a system for extraction of design elements of fashion products, according to the aspects of the present technique.

FIG. 1 is a block diagram illustrating a system 100 for extraction of design elements of fashion products. The system 100 includes a memory 102, a processor 104 and an image acquisition unit 106. The processor 104 further includes, an image segmentation module 108, a contour analytics module 110 and a design elements extraction module 112. Each component is described in further detail below.

The image acquisition unit 106 is configured to access catalogue images 114 of a plurality of fashion products such as available on a fashion e-commerce website. In some embodiments, such catalogue images 114 may be stored in the memory 102. In an embodiment, the catalogue image 114 may be an image of a fashion product such as an image of a top wear, a bottom wear, a footwear, a bag, and the like. In some embodiments, the image acquisition unit 106 may be configured to access the catalogue images 114 from other locations such as from an offline image repository, cloud storage and so forth.

The image segmentation module 108 is configured to segment the catalogue image 114 of the fashion product and to determine an article of interest of the fashion product. As will be known to one skilled in the art, image segmentation techniques are typically used to locate objects and boundaries such as lines and curves in images. As used herein, the term "image segmentation" refers to the process of assigning a label to every pixel in an image such that pixels with the same label share certain characteristics. In an embodiment, the image segmentation module 108 is configured to segment the catalogue image 114 based upon pixel values of the image by determining the pixels that form the article of interest. In an example, a segmentation mask obtained will have pixel values as 0 at all regions which are not a part of the article of interest. In one embodiment, semantic image segmentation technique may be used to perform the image segmentation of the catalogue image 114. However, a variety of other image segmentation techniques may be envisaged.

The contour analytics module 110 is configured to generate an outer contour of the article of interest using a contour tracing technique. In an embodiment, the outer contour of segmented article may be traced using a contour tracing algorithm. Examples of the contour tracing techniques include Square Tracing Algorithm, Moore-Neighbor Tracing, Radial sweep, and the like.

The contour analytics module 110 is further configured to analyze coordinates of the generated contour based upon convexity defects of the generated contour to identify one or more design points. In this embodiment, the contour analytics module 110 is further configured to determine a plurality of convex hull points of the generated contour. Further, a subset of convex hull points is selected from the plurality of convex hull points. In an embodiment, the subset of convex hull points is selected based upon a contour length between adjacent convex hull points or by considering the hull points having substantially high value of curvature. The contour analytics module 110 is further configured to determine one or more convexity defect points on the contour. In one example, one or more convexity defect points on the contour are determined using the plurality of selected convex hull points. As used herein, the term "convexity defects" refers to cavities in an object (e.g., blob, contour, and the like) that are segmented out from an image. In an embodiment, one or more convexity defect points of the contour are analyzed to identify one or more points corresponding to the design elements. In addition, one or more identified points corresponding to the design elements are connected and one or more associated design elements are identified.

The design elements extraction module 112 is configured to extract one or more design elements of the fashion product. The fashion product may be a top wear, a bottom wear, a footwear, a bag or combinations thereof. In an embodiment, one or more design elements of the fashion product are extracted using the identified points corresponding to the design elements. The extracted design elements may include body, sleeves, collar, waist, crest, placket, pockets, leg parts, or combinations thereof. The manner in which the design points are identified and the design elements are extracted will be described in detail with reference to FIGS. 3 through 5.

The memory 102 is configured to store the one or more catalogue images 114 of the fashion products. In an embodiment, the catalogue image may be an image of a fashion product such as an image of a top wear, a bottom wear, a footwear, a bag and the like. In addition, the memory 102 is configured to store details related to extraction of the design elements such as the coordinates of the generated contour, one or more convex hull points and one or more convexity defect points. Moreover, the memory 102 may be configured to store details of the one or more extracted design elements of the fashion product. The extracted design elements may be displayed to a user via an output 116. In some examples, the processor 104 may be further configured to determine one or more attributes corresponding to the design elements. Further, the processor 104 may be configured to annotate selected attributes of the design elements with additional styling. In addition, the processor 104 may be configured to identify design elements corresponding to top-selling fashion products.

Figure 2:
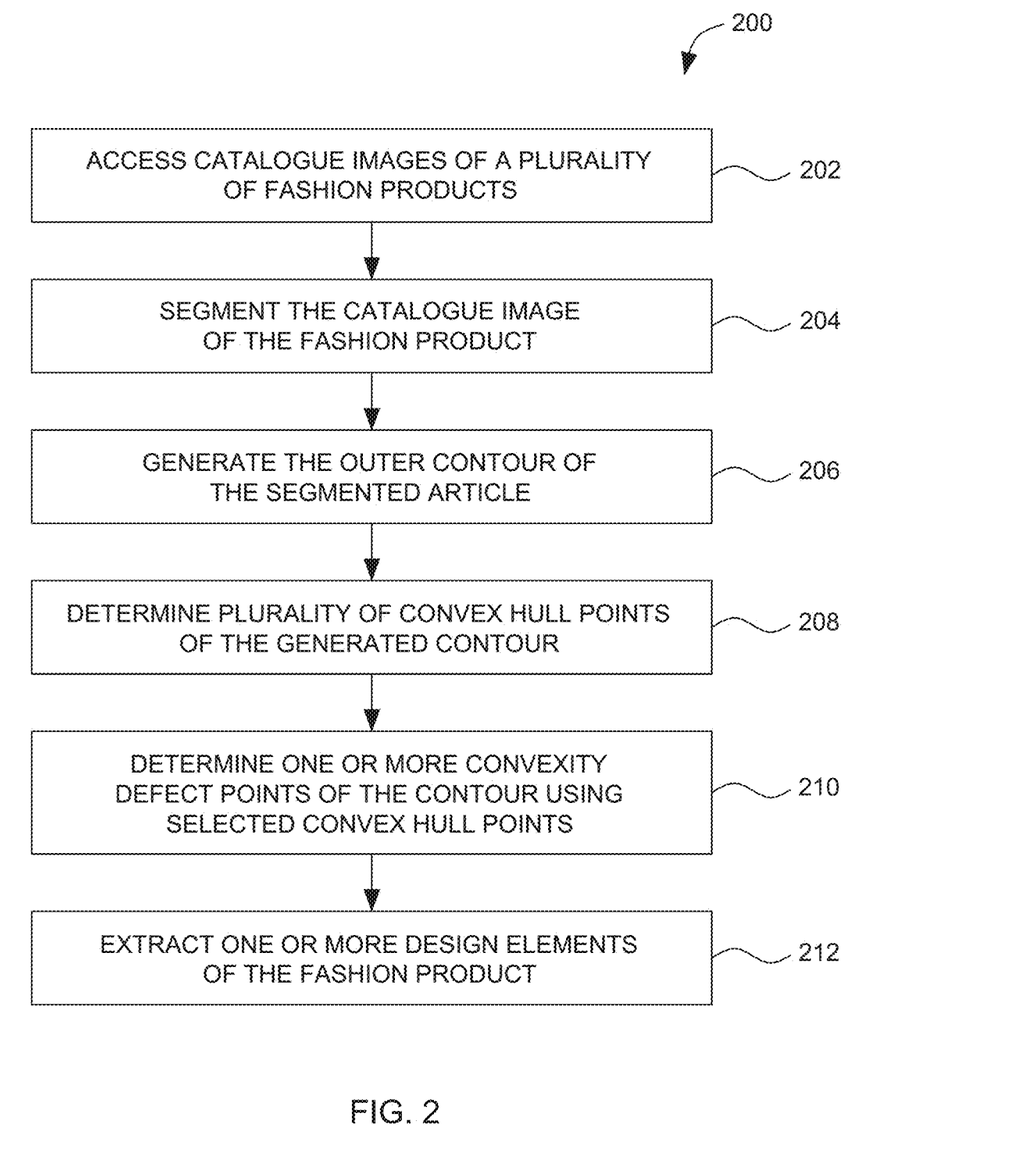
FIG. 2 is an example process for extracting design elements of the fashion products, using the system 100 of FIG. 1, according to the aspects of the present technique.

FIG. 2 is an example process 200 for extracting design elements of the fashion products, using the system 100 of FIG. 1, according to the aspects of the present technique.

At step 202, catalogue images of a plurality of fashion products are accessed. In an embodiment, the catalogue image may be an image of a fashion product such as an image of a top wear, a bottom wear, a footwear, a bag, and the like. In some embodiments, the catalogue images are accessed from other locations such as from an offline image repository, cloud storage and so forth.

At step 204, the catalogue image of the fashion product is segmented to determine an article of interest of the fashion product. In an embodiment, the catalogue image is segmented based upon pixel values of the image by determining the pixels that form the article of interest. In an example, a segmentation mask obtained will have pixel values as 0 at all regions which are not a part of the article of interest. In one embodiment, semantic image segmentation technique may be used to perform the image segmentation of the catalogue image. However, a variety of other image segmentation techniques may be envisaged.

At step 206, an outer contour of the article of interest is generated using a contour tracing technique. In an embodiment, the outer contour of the segmented article may be traced using a contour tracing algorithm. Examples of the contour tracing techniques include Square Tracing Algorithm, Moore-Neighbor Tracing, Radial sweep, and the like.

At step 208, a plurality of convex hull points of the generated contour are determined. Further, a subset of convex hull points is selected from the plurality of convex hull points. In an embodiment, the subset of convex hull points is selected based upon a contour length between adjacent convex hull points or by considering those hull points with a substantially high value of curvature.

At step 210, one or more convexity defect points on the contour are determined. In one embodiment, one or more convexity defect points on the contour are determined using the plurality of selected convex hull points. In another embodiment, one or more convexity defect points of the contour are analyzed to identify one or more points corresponding to the design elements. In addition, the one or more identified points corresponding to the design elements are connected and one or more associated design elements are identified.

At step 212, one or more design elements of the fashion product are extracted. The fashion product may be a top wear, a bottom wear, a footwear, a bag, or combinations thereof. In an embodiment, one or more design elements of the fashion product are extracted using the identified points corresponding to the design elements. The extracted design elements may include body, sleeves, collar, waist, crest, placket, pockets, leg parts, or combinations thereof.

As described above, the design points are identified and the design elements are extracted. The manner in which it is achieved is described in further detail below.

Figure 3:
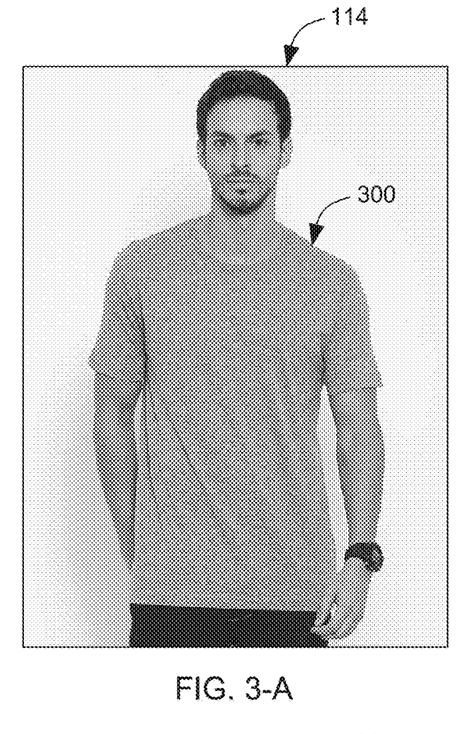

FIG. 3-A illustrates an example catalogue image 114 of a fashion product accessed using the system 100 of FIG. 1, according to the aspects of the present technique. In some embodiments, the catalogue images (e.g., 114) typically may include fashion models displaying a fashion product 300. In this example, a catalogue image 114 of a top wear (t-shirt) 300 available on fashion e-commerce website is accessed. In some embodiments, the catalogue image 114 may be stored in the memory 102 or may be accessed from other locations such as from an offline image repository, cloud storage and so forth. The system 100 is configured to extract one or more design elements of the top wear 300. Such design elements may include details of collar, sleeves, and the like.

FIG. 3-B illustrates an example image 310 of an article of interest 312 of the fashion product 300 of FIG. 3-A, according to the aspects of the present technique. In this example, the article of interest 312 of the top wear is determined by segmentation of the catalogue image 114 of FIG. 3-A. In an embodiment, the catalogue image 114 is segmented based upon pixel values of the image by determining the pixels that form the article of interest 312. In the illustrated example, a segmentation mask obtained will have pixel values as 0 at all regions which are not a part of the article of interest. Further, the manner in which the design points are identified and the design elements are extracted is described below with some illustrated examples.

Figure 4:
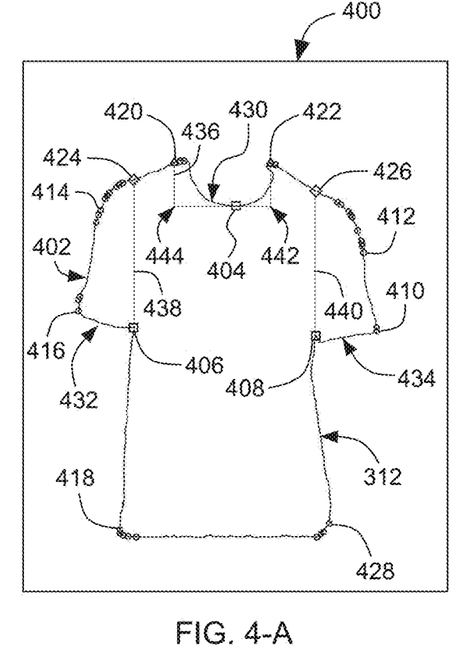

FIG. 4-A illustrates identification of design points 400 of the article of interest 312, according to the aspects of the present technique. In this embodiment, an outer contour 402 of the article of interest 312 is traced using a contour tracing technique. Such tracing techniques are known in the art. Further, the coordinates of the contour 402 are analysed to identify one or more design points of the article of interest 312. In the given example, a plurality of the design points generally represented by reference numerals 404 through 426, on the contour 402 are determined. In an embodiment, convex hull points are identified as the design points on the contour 402. In general, the term "convex hull of a set "N" is the smallest perimeter fence enclosing all the points. As used herein, the term "convex hull points" refers to the smallest convex set of points in which a given set of points is contained.

The design points (e.g., 404 through 426) may be classified as landmark points, skeletal points, and the like. In particular, the design points (e.g., 404 through 426) are used to delineate the design elements of the article of interest 312. The identified design points are connected via lines (e.g., 436, 438, 440) to delineate the respective design elements. For example, design elements such as collar 430 and sleeves (438, 440) are delineated using the design points (e.g., 404 through 426).

In this example, the design points illustrated with a square shape are innermost points on the contour 402, are generally represented by reference numerals 404, 406, 408. These points 404, 406, 408 correspond to the collar 430 and sleeves (432, 434) of the top wear 300. Similarly, the points illustrated with a circular shape (410, 412, 414, 416, 418, 428) represent points of the convex hull inside which all the points of the contour 402 lie. In some examples, some of the convex hull points may be too close to each other. In this embodiment, design points (for example 410, 412, 414, 416) are selected such that the points deviate from an adjacent design point by more than a certain contour length, that is, the contour length between two of the circular points exceeds a certain value. Such threshold for the contour length between adjacent design points may be determined by a user. In this embodiment, a subset of such convex hull points (400) from the plurality of convex hull points is selected. The other option is to take those convex hull points with maximum curvature.

Further, in an embodiment, one or more convexity defect points using the selected convex hull points are determined. In the illustrated example of FIG. 4-A, the points illustrated with a square shape (404, 406, 408) deviate maximum from the convex hull points as they represent three innermost points on the contour 402. The identified innermost points are assigned to a corresponding design element of the fashion product. In the given illustrated example, the identified point 404 is assigned to the collar 430 of the top wear 300 and points 406, 408 are assigned to corresponding sleeves 432 and 434 of the top wear 300. In addition to the innermost point, other points such as 420, 422, 424 and 426 are identified.

In an embodiment, "x" and "y" coordinates of the identified points 404, 406, 408, 420, 422, 424, 426 are determined. In this example, the x-coordinate (xc) of the point 404 corresponding to a collar 430 of the top wear 300 may lie between points corresponding to sleeves on either side. Similarly, the y-coordinate (yc) of the point 404 corresponding to the collar 430 may lie lower than those of points corresponding to the sleeve on either side. Alternatively, for the remaining innermost two points 406, 408, the one with lower x-coordinate value (406) corresponds to the right sleeve 432 and the other one (408) corresponds to the left sleeve 434. In an embodiment, the coordinates (xl, yl) and (xr, yr) of the two convex hull points 422 and 420 on either side of the collar 430 along with collar point 404 (xc, yc) are identified. Similarly, coordinates of remaining identified points such as 424 and 426 corresponding to other design elements (e.g. sleeves) are determined. It should be noted that the points 424 and 426 have the same x-coordinate as that of 406 and 408 respectively.

FIG. 4-B illustrates extracted design elements of the fashion product, according to the aspects of the present technique. In the illustrated embodiment, the identified points on the collar (420, 404, 422) are joined to demarcate the collar region. In this example, the demarcation of collar 430 is achieved by joining (xl, yl) (422) to (xl, yc) (442), (xr, yr) (420) to (xr, yc) (444) and (xl, yc) (442) to (xr, yc) (444). The collar demarcation obtained is represented in this embodiment with reference numeral 436. Alternatively, identified points on the sleeves are joined (406 to 424) and (408 to 426) to demarcate the sleeve region. The demarcated sleeve regions obtained are represented in this embodiment by two vertical lines 438 and 440. In an embodiment, the demarcation of sleeve 432 is achieved by assigning the point (xm, ym) as a starting point. Further, the value of ym is decremented in step sizes of 1 until the pixel value at point (xm, ym) in segmentation mask becomes 0. This step is repeated for other sleeve 434 for point (xn, yn). Another way of determining the other end point of the sleeve is to search for a point on the contour with the same x-coordinate as xm and the steps are repeated for xn.

Figure 5:
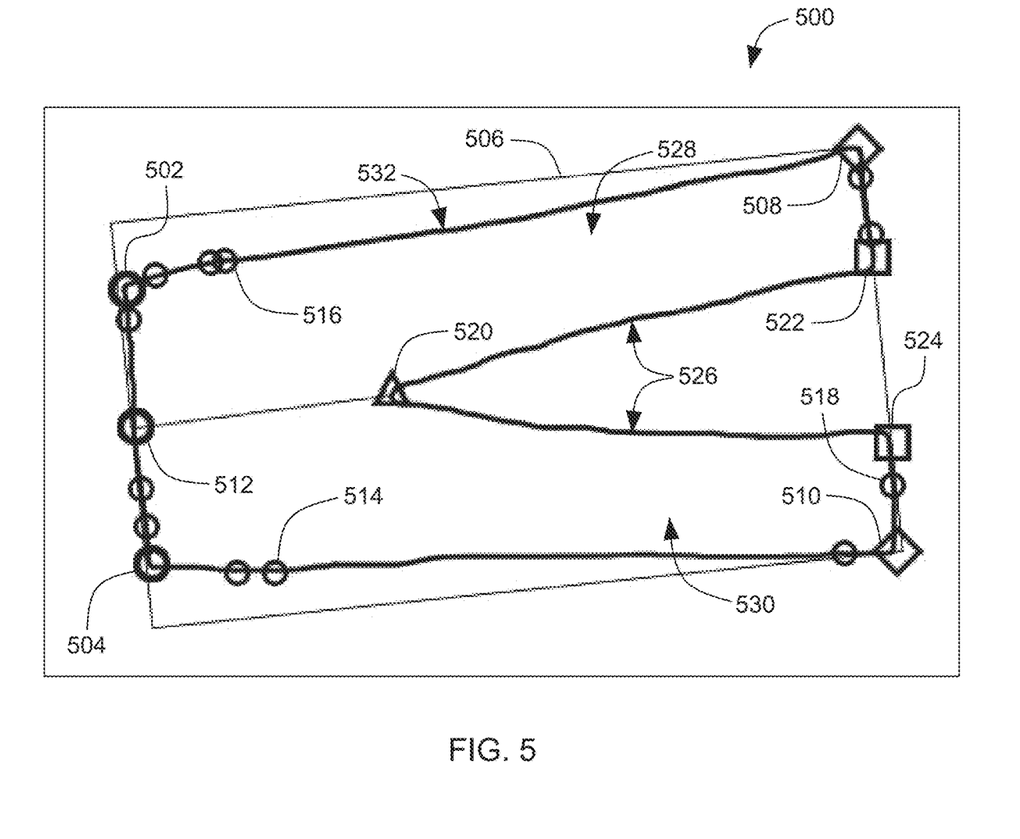
FIG. 5 illustrates an example for identification of design points of a bottom wear, according to the aspects of the present technique.

FIG. 5 illustrates an example 500 for identification of design points of a bottom wear, according to the aspects of the present technique. In an embodiment, the design elements of a bottom wear (e.g., trouser) are identified. In this example, an outer contour 532 of the bottom wear is traced using a contour tracing technique. Further, the coordinates of the contour 532 are analysed to identify one or more design points of the bottom wear. In the given example, a plurality of the design points generally represented by reference numerals 502 through 524, on the contour 532 are determined. In an embodiment, convex hull points are identified as the design points on the contour 532. In particular, the design points (e.g., 502 through 524) are used to delineate the design elements on the contour 532 of the bottom wear.

In this example, the design points illustrated by circular shape are generally represented by reference numerals 502, 504. The points 502 and 504 are identified as waist points of the bottom wear. In an embodiment, a rotated minimum bounding rectangle (RMBR) 506 of the outer contour 532 is determined. In addition, two corners of the RMBR 506 are determined. These points illustrated as a diamond shape are represented with reference numerals 508 and 510. In one embodiment, point 508 and point 510 are determined by assuming a certain orientation of the bottom wear (horizontal or vertical spread). For the orientation illustrated in the given example, the two points 508 and 510 correspond to the two corners of the RMBR with largest y-coordinate values. The points on the contour that are farthest away from points 508 and 510 are identified as the waist points (502, 504) on the contour 532 of the bottom wear.

In a further embodiment, the convex hull points (502 through 524) are used to determine the convexity defect points of the contour 532. Such convex hull points are identified as the design points on the contour 532. For example, the point (represented by a triangular shape) with the maximum convexity defect is identified as an inseam point represented by reference numeral 520. In addition, two hull points on either side of the inseam point 520 are identified as inward points of left leg 528 and right leg 530. The two hull points corresponding to left and right legs are represented by reference numerals 522 and 524. The distance between the inseam point 520 and the left/right leg points (522, 524) is identified as inseam length 526. In this example, point 512, located midway between the waist points 502 and 504 on the contour 532 is determined.

In the illustrated embodiment, the identified point 512 and inseam point 520 are connected to demarcate the left and right leg regions. The demarcated left and right regions 528 and 530 respectively obtained are extracted as corresponding design element of the bottom wear.

The modules of the system 100 described herein are implemented in computing devices. One example of a computing device 600 is described below in FIG. 6. The computing device includes one or more processor 602, one or more computer-readable RAMs 604 and one or more computer-readable ROMs 606 on one or more buses 608. Further, computing device 600 includes a tangible storage device 610 that may be used to execute operating systems 620 and the system 100. The various modules of system 100 include a memory 102, a processor 104 and an image acquisition unit 106. The processor 104 further includes, an image segmentation module 108, a contour analytics module 110 and a design elements extraction module 112. Both, the operating system 620 and the system 100 are executed by processor 602 via one or more respective RAMs 604 (which typically include cache memory). The execution of the operating system 620 and/or the system 100 by the processor 602, configures the processor 602 as a special purpose processor configured to carry out the functionalities of the operation system 620 and/or system 100, as described above.

Examples of storage devices 610 include semiconductor storage devices such as ROM 606, EPROM, flash memory or any other computer-readable tangible storage device that may store a computer program and digital information.

Figure 6:
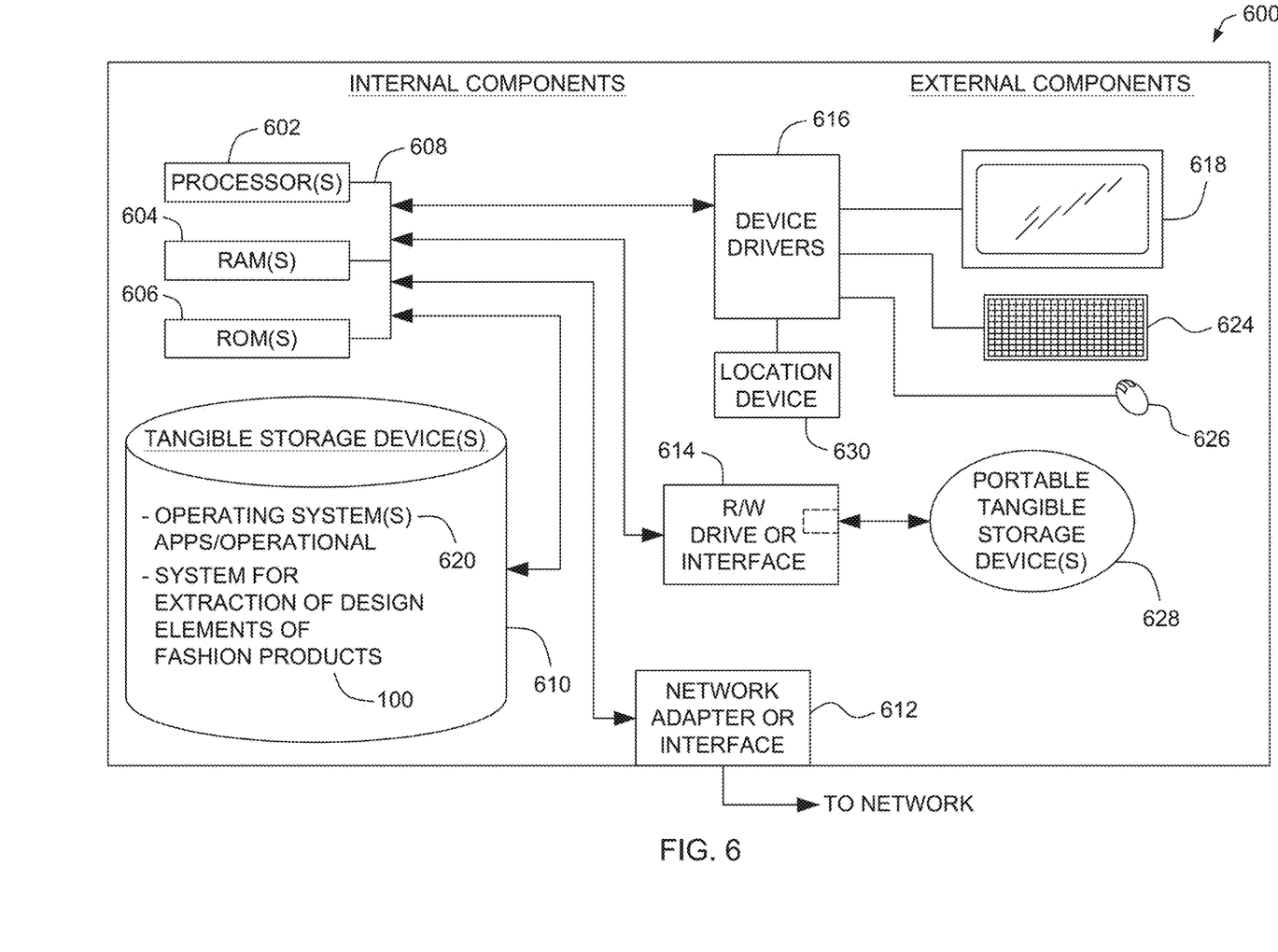
FIG. 6 is a block diagram of an embodiment of a computing device in which the modules of the system, described herein, are implemented.

Computing device also includes a R/W drive or interface 614 to read from and write to one or more portable computer-readable tangible storage devices 628 such as a CD-ROM, DVD, memory stick or semiconductor storage device. Further, network adapters or interfaces 612 such as a TCP/IP adapter cards, wireless Wi-Fi interface cards, or 3G or 4G wireless interface cards or other wired or wireless communication links are also included in computing device.

In one example embodiment, the system 100 which includes a memory 102, a processor 104 and an image acquisition unit 106. The processor 104 further includes, an image segmentation module 108, a contour analytics module 110 and a design elements extraction module 112, may be stored in tangible storage device 610 and may be downloaded from an external computer via a network (for example, the Internet, a local area network or other, wide area network) and network adapter or interface 612.

Computing device further includes device drivers 616 to interface with input and output devices. The input and output devices may include a computer display monitor 618, a keyboard 624, a keypad, a touch screen, a computer mouse 626, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A system for extraction of design elements of a fashion product, the system comprising:
   a memory having computer-readable instructions stored therein; and
   a processor configured to execute the computer-readable instructions to:
   access a catalogue image of a fashion product;
   segment the catalogue image of the fashion product to determine an article of interest of the fashion product;
   generate an outer contour of the article of interest using a contour tracing technique;
   analyze coordinates of the outer contour generated based upon convexity defects of the outer contour to identify one or more design points;
   extract one or more design elements of the fashion product using the one or more design points identified;
   determine a plurality of convex hull points of the outer contour generated;
   select a subset of convex hull points from the plurality of convex hull points determined, based upon a contour length between adjacent convex hull points;
   determine one or more convexity defect points on the contour by using the subset of convex hull points selected; and
   extract the one or more design elements of the fashion product using the one or more convexity defect points determined and the subset of convex hull points selected.

2. The system of claim 1, wherein the processor is further configured to execute the computer-readable instructions to extract the one or more design elements of one or more of a top wear, a bottom wear, foot wear, and bags.

3. The system of claim 2, wherein the processor is further configured to execute the computer-readable instructions to extract one or more of body, sleeves, collar, placket, pockets, leg parts, waist, and crest of the fashion product.

4. The system of claim 1, wherein the processor is further configured to execute the computer-readable instructions to:
   determine one or more attributes corresponding to the one or more design elements;
   annotate selected attributes of the one or more design elements with additional styling; and
   identify one or more design elements corresponding to top-selling fashion products.

5. The system of claim 1, wherein the processor is further configured to execute the computer-readable instructions to segment the catalogue image based upon pixel values of the image.

6. The system of claim 1, wherein the processor is further configured to execute the computer-readable instructions to identify the one or more design points corresponding to the one or more design elements of the fashion product.

7. A method for extracting design elements of a fashion product, the method comprising:
   accessing a catalogue image of a fashion product;
   segmenting the catalogue image of the fashion product to determine an article of interest of the fashion product;
   generating an outer contour of the article of interest using a contour tracing technique;
   analyzing coordinates of the outer contour based generated upon convexity defects of the outer contour to identify one or more design points corresponding to the design elements;
   extracting one or more design elements of the fashion product using the one or more design points identified;
   determining a plurality of convex hull points of the outer contour generated;
   selecting a subset of convex hull points from the plurality of convex hull points determined, based upon a contour length between adjacent convex hull points;
   determining one or more convexity defect points on the contour by using the subset of convex hull points selected; and
   extracting the one or more design elements of the fashion product using the one or more convexity defect points determined and the subset of convex hull points selected.

8. The method of claim 7, further comprising connecting the one or more design points and identifying one or more design elements associated with the one or more design points identified.

9. The method of claim 7, further comprising identifying one or more design elements corresponding to top-selling fashion products.

10. A system for extraction of design elements of a fashion product, the system comprising:
    a non-transitory memory having computer-readable instructions stored therein; and
    a processor configured to execute the computer-readable instructions to:
    access a catalogue image of a fashion product;
    segment the catalogue image of the fashion product to determine an article of interest of the fashion product;
    generate an outer contour of the article of interest using a contour tracing technique;
    determine a plurality of convex hull points of the outer contour generated;
    determine one or more convexity defect points using the plurality of convex hull points to identify one or more design points;
    extract one or more design elements of the fashion product using the one or more design points identified;
    determine a plurality of convex hull points of the outer contour generated;
    select a subset of convex hull points from the plurality of convex hull points determined, based upon a contour length between adjacent convex hull points;
    determine one or more convexity defect points on the contour by using the subset of convex hull points selected; and
    extract the one or more design elements of the fashion product using the one or more convexity defect points determined and the subset of convex hull points selected.

11. The system of claim 10, wherein the processor is further configured to execute the computer-readable instructions to:
    select a subset of convex hull points from the plurality of convex hull points based upon a contour length between adjacent convex hull points; and determine one or more convexity defect points using the convex hull points selected.

12. The system of claim 10, wherein the processor is further configured to execute the computer-readable instructions to determine the one or more design elements corresponding to the article of interest of the fashion product.

13. The system of claim 10, wherein the processor is further configured to execute the computer-readable instructions to extract the one or more design elements of one or more of a top wear, a bottom wear, foot wear, and bags.

14. The system of claim 13, wherein the processor is further configured to execute the computer-readable instructions to extract one of more of body, sleeves, collar, placket, pockets, leg parts, waist, and crest of the fashion product.

\* \* \* \* \*